United States Patent
Watson et al.

(10) Patent No.: US 8,714,212 B2
(45) Date of Patent: May 6, 2014

(54) FUEL INLET INCLUDING A NOZZLE RETENTION DEVICE

(76) Inventors: Kenneth A. Watson, Vancouver, WA (US); Evan S. Waymire, Oregon City, OR (US)

(*) Notice: Subject to any disclaimer, the term of this patent is extended or adjusted under 35 U.S.C. 154(b) by 399 days.

(21) Appl. No.: 12/928,708

(22) Filed: Dec. 17, 2010

(65) Prior Publication Data
US 2012/0152948 A1 Jun. 21, 2012

(51) Int. Cl.
*B65B 1/04* (2006.01)
*B65B 3/00* (2006.01)
*B60K 15/04* (2006.01)

(52) U.S. Cl.
CPC .................... *B60K 15/0403* (2013.01)
USPC .................... 141/350; 220/86.2; 220/86.3

(58) Field of Classification Search
USPC .................... 141/350; 220/86.2
See application file for complete search history.

(56) References Cited

U.S. PATENT DOCUMENTS

| | | | | |
|---|---|---|---|---|
| 3,016,161 A | * | 1/1962 | Peplin ................. | 220/86.2 |
| 3,991,792 A | * | 11/1976 | Kettler ................. | 138/108 |
| 4,630,748 A | * | 12/1986 | Keller ................. | 220/86.3 |
| 4,635,813 A | * | 1/1987 | Peickert ............... | 220/86.2 |
| 4,877,146 A | * | 10/1989 | Harris ................. | 220/746 |
| 4,881,578 A | * | 11/1989 | Rich et al. ............ | 141/44 |
| 5,025,946 A | * | 6/1991 | Butkovich et al. ...... | 220/86.3 |
| 5,031,302 A | * | 7/1991 | Anhegger et al. ....... | 29/516 |
| 5,451,927 A | * | 9/1995 | Thompson .............. | 340/457 |
| 5,735,322 A | * | 4/1998 | Palvolgyi ............. | 141/386 |
| 6,257,287 B1 | * | 7/2001 | Kippe et al. .......... | 141/198 |
| 6,289,945 B1 | * | 9/2001 | Haboush, II ........... | 141/59 |
| 6,918,504 B2 | * | 7/2005 | Miura et al. .......... | 220/86.2 |
| 7,040,360 B2 | * | 5/2006 | Watson ................ | 141/255 |
| 7,059,365 B2 | * | 6/2006 | O'Connell ............. | 141/46 |
| 7,082,973 B2 | * | 8/2006 | Ganachaud et al. ...... | 141/350 |
| 7,677,278 B2 | * | 3/2010 | Pacitto et al. ........ | 141/350 |

* cited by examiner

*Primary Examiner* — Timothy L Maust
(74) *Attorney, Agent, or Firm* — Ingrid McTaggart

(57) ABSTRACT

One embodiment of a fuel inlet includes a tube including a side wall having an interior surface that defines an interior adapted for receiving a fuel nozzle therein and for receiving fuel there through, and the side wall including a raised region that extends circumferentially around the interior surface of the side wall and inwardly into the interior.

21 Claims, 1 Drawing Sheet

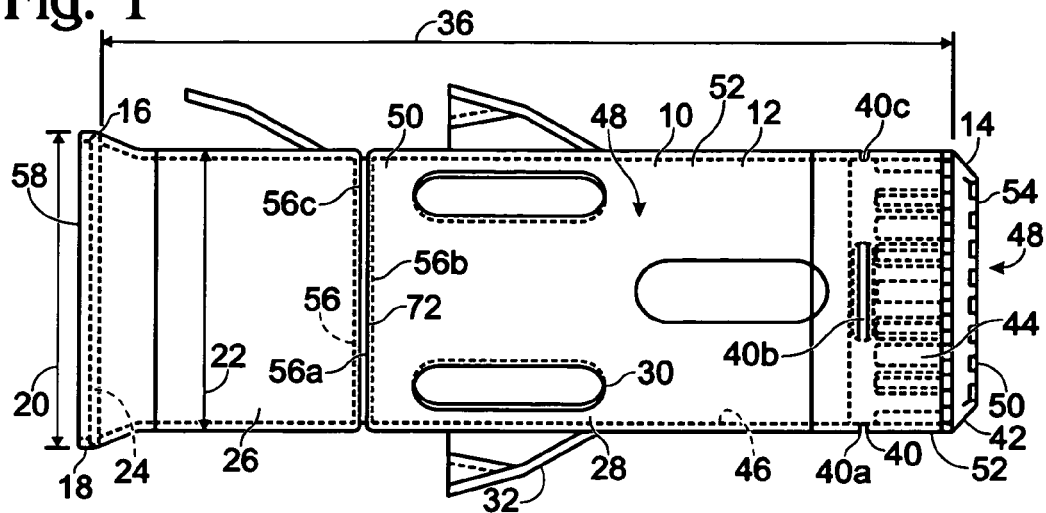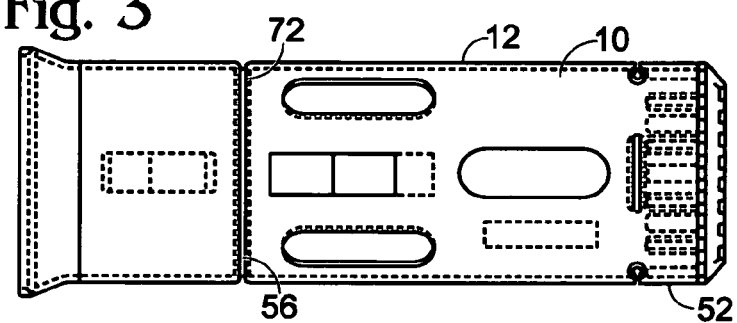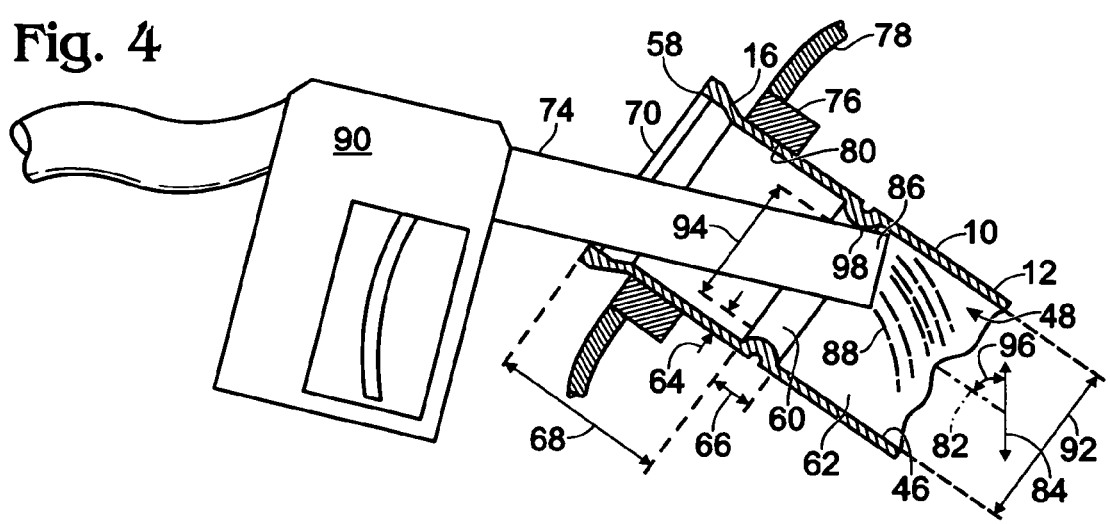

FUEL INLET INCLUDING A NOZZLE RETENTION DEVICE

BACKGROUND OF THE INVENTION

The present invention is particularly intended for use on fuel tanks on commercial vehicles, although it may be used on any fuel tank connected to any type of engine. Fuel tanks typically include a fuel inlet or opening through which fuel is filled into the fuel tank. On commercial vehicles the fuel tanks may be quite large. Due to the large size of the fuel tank, filling of the fuel tanks make take a long time.

Some fuel inlets may define a length and an inner diameter that act to retain a fuel nozzle in place and allow the operator to release their grip on the fuel nozzle without the fuel nozzle falling from the fuel inlet during filling of a fuel tank with fuel. However, some fuel inlets have a length and an inner diameter that do not facilitate retention of a fuel nozzle within the fuel inlet unless the operator manually holds the fuel nozzle in the fuel inlet during the entire fuel filling process. Due to the large size of the fuel tank and the large amount of fuel required to fill a fuel tank, which may be 150 gallons of fuel, for example, an operator may be required to stand next to the fuel tank during filling and hold the fuel nozzle during the entire filling operation. This operation may be tiresome for the operator, especially in extremely cold winter conditions or very hot summer conditions. Moreover, this operation may also expose the operator to fuel fumes during the entire fuel tank filling process.

There is a need, therefore, for a fuel inlet that retains a fuel nozzle therein without requiring an operator to manually hold the fuel nozzle during the entire filling operation.

SUMMARY OF THE INVENTION

One embodiment of a fuel inlet includes a tube including a side wall having an interior surface that defines an interior adapted for receiving a fuel nozzle therein and for receiving fuel there through. The side wall includes a raised region that extends circumferentially around the interior surface of the side wall and inwardly into the interior. The raised region acts to retain a fuel nozzle thereon, thereby allowing an operator to release his or her grip on the fuel nozzle during fueling of fuel into a fuel tank to which the fuel inlet is secured.

BRIEF DESCRIPTION OF THE DRAWINGS

FIG. 1 is a side view of one example embodiment of a fuel inlet of the present invention.

FIG. 2 is a back view of one example embodiment of a fuel inlet of the present invention.

FIG. 3 is a bottom view of one example embodiment of a fuel inlet of the present invention.

FIG. 4 is a side cross section view of one example embodiment of a fuel inlet of the present invention showing a fuel nozzle retained therein by a raised region of the fuel inlet.

DETAILED DESCRIPTION OF THE PREFERRED EMBODIMENTS

FIG. 1 is a side view of one example embodiment of a fuel inlet assembly 10 of the present invention. Fuel inlet assembly 10 in the embodiment shown comprises an elongate cylindrical body portion 12 including a first end region 14 and a second end region 16. First end region 14 is adapted to be received within a fuel filler tube or opening of a fuel tank (see FIG. 4) and second end region 16 is adapted to extend outwardly from or be positioned flush with a fuel tank opening (see FIG. 4). In other embodiments fuel inlet assembly 10 may be secured directly to either an exterior of or an interior of a fuel tank without being positioned within a fuel filler tube. In other words, the assembly 10 of the present invention may be an insert for a filler tube or may comprise the filler tube itself, secured either exterior of or interior of a fuel tank.

Second end region 16 may include a lip 18 or another type of outwardly extending projection so as to secure the tube against movement through the opening and into the fuel tank (see FIG. 4). Accordingly, lip 18 may have an outer diameter 20 that is greater than an outer diameter 22 of body portion 12 of assembly 10. An O-ring may be placed around an exterior surface 26 of body 12 and adjacent lip 18 to provide a seal between lip 18 and the opening of a fuel tank (see FIG. 4) when the assembly is secured thereto.

Body 12, in a central region 28 thereof, may include a plurality of apertures 30 which may allow fluid and/or air to pass there through. Central region 28 may further include one or more retaining or deflection members, such as a tang 32, extending outwardly from body 12. Tang 32 generally extends outwardly from body 12 in an upper region of assembly 10, toward second region 16 of body 12, such that tang 32 acts to retain body 12 within a fuel tank once assembly 10 is inserted therein. In particular, tang 32 may extend outwardly from body 12 to define a diameter that may be larger than the diameter of an opening (see FIG. 4) of a fuel tank such that assembly 10 is not easily removed from the opening in the direction through which the assembly was inserted. Accordingly, tang 32 and lip 18 together generally will retain assembly 10 in place on a fuel tank and against tampering or removal of the assembly from the fuel tank after installation thereof.

Body 12 of assembly 10, in the embodiment shown, is manufactured by the process of extrusion, such that body 12 may be seamless along its length 36. Lip 18, apertures 30 and tang 32 may be formed in body 12 after the extrusion process. Body 12 may be manufactured of aluminum but any durable material such as steel or heavy duty plastic may be utilized.

Still referring to FIG. 1, first end region 14 of body 12 may include a first crimp 40 and a second crimp 42 which may secure an anti-siphon insert 44 to an interior surface 46 and within an interior 48 of body 12. First crimp 40 may comprise a set of crimped regions, three of which, 40a, 40b and 40c, are visible in this figure, that may each extend at least partially around an exterior perimeter 50 of body 12. In the embodiment shown, exterior perimeter 50 defines an exterior circumference 52 of cylindrical body 12. First crimps 40a, 40b and 40c may be indented or inwardly protruding regions of body 12 that extend partially into interior 48 of body 12 such that crimped regions 40a, 40b and 40c define an inner diameter that is smaller than an inner diameter of an uncrimped region of body 12.

In the embodiment shown, length 36 of body 12 may be in a range of approximately seven to twelve inches, and first crimps 40a, 40b and 40c may be positioned approximately ¾ of an inch from a lower end 54 of body 12. Crimps 40a, 40b and 40c may extend into interior 48 of body 12 approximately 1/16 of an inch. First crimps 40, including 40a, 40b and 40c, may be added to body 12 after extrusion of body 12. Projection of first crimp 40 into interior 48 of body 12 only through a portion of interior 48, such as only 1/16 of an inch, generally requires less compression force than completely compressing body 12 around its diameter. Accordingly, the impacting process, such as a crimping process, of the present invention may utilize a smaller sized crimping machine than a heavy duty compressing machinery that may be utilized by prior art devices. Accordingly, the present invention has reduced manufacturing costs when compared to prior art anti-siphon assemblies.

Second crimp 42 may comprise a crimped region that extends completely around exterior perimeter 50 at lower end 54 of body 12. Second crimp 42 may be manufactured on body 12 after extrusion thereof. Second crimped region 42 may be an indentation or an inwardly protruding region of body 12 that defines an inner diameter that is smaller than an inner diameter of body 12. Second crimp 42 may extend into interior 48 of body 12 approximately ⅛ of an inch and may define an angle of approximately 45 degrees with respect to length 36 of body 12. Accordingly, crimps 40 and 42 may retain insert 44 within interior 48 and between the first and second crimped regions 40 and 42.

Still referring to FIG. 1, assembly 10 further includes a third crimp 56 positioned generally in second end region 16 so that third crimp 56 is positioned generally near to an opening 58 of fuel inlet assembly 10 that receives a fuel nozzle therein (see FIG. 4) so as to receive fuel during fueling of a fuel tank (see FIG. 4). In one embodiment, third crimp 56 may be manufactured by impacting exterior surface 26 of body 12 with a crimping machine in several different locations around the exterior circumference 52 of body 12. In particular, body 12 may first be impacted in a first region 56a that extends approximately forty to eighty degrees around the exterior circumference 52 of body 12, for example. Body 12 may then be rotated so that a second region 56b may be impacted, and the process repeated to define third, fourth and fifth regions 561c, 56d and 56e, etc. In this manner, body 12 may be impacted, or crimped, completely or partially around exterior circumference 52 of body 12 to define a raised region 60 (see FIG. 4), also referred to as a raised rib, on interior surface 46 of body 12. In one example embodiment, a crimping region that extends approximately seventy degrees around the circumference of body 12 is crimped, and body 12 rotated so that five sequential crimping steps are slightly overlapping to result in a finished crimp 56 that extends completely around external circumference 52 of body 12.

Referring to FIGS. 1 and 4, raised region 60 extends radially inwardly into interior 48 of body 12 and, in the embodiment shown, extends completely around the inner circumference 62 of body 12. Raised region 60 may extend radially inwardly from interior surface 46 of body 12 a distance sufficient to secure a tip of a fuel nozzle thereon during fueling of the fuel tank (see FIG. 4) to which body 12 is secured. In the embodiment shown, raised region 60 extends radially inwardly from a remainder of interior side wall 46 a height 64 of approximately ³⁰⁄₁,₀₀₀$^{th}$ of an inch. Accordingly, a region of interior surface 46 of body 12, that excludes raised region 60, defines a first inner diameter 92, and raised region 60 defines a second inner diameter 94, wherein second inner diameter 94 is smaller than first inner diameter 92.

The raised region 60 defines a width 66 of approximately ¹⁄₁₆$^{th}$ of an inch, and is positioned a distance 68 of approximately two and ¼ of an inch from an end 70 of second end region 16 of body 12. Body 12 generally defines a length of greater than five inches and the raised region 60 generally is positioned within four inches from a fuel nozzle receiving opening so that a tip region of the fuel nozzle may be "captured" by raised region 60 when the fuel nozzle is inserted into body 12.

In other embodiments, other dimensions may be utilized, wherein raised region 60 should not be manufactured in a size that will hinder placement of a fuel nozzle into interior 48 of fuel inlet assembly 10. In other words, raised region 60 preferably is manufactured of a size sufficient to retain a fuel nozzle tip within body 12 without hindering placement of the fuel nozzle tip into body 12 for fueling, and without hindering removal of a fuel nozzle tip from body 12 by manual removal when fueling is completed.

Crimping of body 12 on exterior surface 26 to define raised region 60 on the interior surface 46 of body 12 will result in a recess 72 being formed on exterior surface 26, wherein recess 72 may extend completely or partially around the exterior circumference 52 of exterior surface 26 of body 12 and corresponds to the location of impacting conducted on body 12. Accordingly, raised region 60 on interior surface 46 of body 12 is formed from the side wall of body 12 itself, and is not formed by securing another component to body 12, such as a snap ring or the like. The raised region 60, also referred to a fuel nozzle retaining device, may be manufactured, therefore, by the relatively simple and inexpensive step of impacting, without requiring machining of the interior of body 12 to define a groove, and without requiring use of additional parts or placement steps, such as placing a snap ring in a formed groove. Moreover, the crimping step of the present invention may be performed along with the crimping steps utilized to hold an anti-siphon device 44 within body 12, thereby streamlining the manufacturing process and reducing labor time and costs.

FIG. 2 is a back view of one example embodiment of a fuel inlet 10 of the present invention.

FIG. 3 is a bottom view of one example embodiment of a fuel inlet 10 of the present invention. In this view, third crimp 56 is shown extending around exterior circumference 52 of body 12.

FIG. 4 is a side cross section view of one example embodiment of a fuel inlet 10 of the present invention showing a fuel nozzle 74 retained therein by raised region 60 of the fuel inlet body 12. In this embodiment, body 12 is shown secured to a fuel filler neck 76 that is secured to a fuel tank 78. Securement may be carried out by any means, such as by welding. Fuel filler neck 76 defines an opening 80 into which body 12 of fuel inlet assembly 10 is secured such that opening 58 of body 12 extends slightly outwardly of tank 78. In other embodiments, opening 58 of body 12 may be positioned further outwardly of tank 78 or may be positioned flush with opening 80 of fuel filler neck 76 or any other arrangement as may be desired. Body 12 is shown secured within tank 78 such that an elongate axis 82 of body 12 may define an angle 96 from a vertical axis 84 in a range of five to fifty degrees, for example.

Still referring to FIG. 4, a tip 86 of fuel nozzle 74 is inserted into interior 48 of fuel inlet 10. A surface 98 of fuel nozzle tip 86 is engaged by raised region 60 on interior surface 46 of body 12 such that raised region 60 prevents fuel nozzle tip 86 from slipping along interior surface 46 of body 12 toward opening 58 and thereby prevents fuel nozzle tip 86 from falling from opening 58 of fuel inlet assembly 10. Accordingly, raised region 60 retains fuel nozzle 74 in place within fuel inlet assembly 10 during fueling of fuel 88 into tank 78 such that an operator may release his or her grip on fuel nozzle handle 90 during the fuel filling process. This time saving raised rib 60 design is manufactured with an inexpensive stamping process that does not substantially raise the cost of producing fuel inlet assembly 10 yet which increases the time saving valve of assembly 10.

In the above description numerous details have been set forth in order to provide a more through understanding of the present invention. It will be obvious, however, to one skilled in the art that the present invention may be practiced using other equivalent designs.

We claim:

1. A fuel tank including a nozzle retention device, comprising:
   a fuel tank that defines an interior;
   a tube secured to said fuel tank with a majority of said tube positioned within said interior of said fuel tank, said tube formed as a single, unitary structure and including a continuous side wall that defines an interior of said tube, said side wall defining a fluid flow path through said interior of said tube and into said fuel tank;
   said continuous side wall including a rigid raised region extending circumferentially around said side wall and radially inwardly into said interior of said tube, said raised region formed integral with said side wall of said tube and forming a nozzle retention device, said raised region of said side wall positioned within said interior of said fuel tank; and
   an anti-siphon device positioned completely within said interior of said tube, completely within said interior of said fuel tank, and secured against said continuous side wall downstream from said raised region.

2. A fuel tank according to claim 1 wherein said raised region is manufactured by the process of stamping an exterior of said tube.

3. A fuel tank according to claim 1 wherein said tube defines a length of greater than five inches and a fuel nozzle receiving opening, and wherein said raised region is positioned within four inches from said fuel nozzle receiving opening.

4. A fuel tank according to claim 1 wherein said raised region extends radially inwardly into said interior of said tube at least $20/1,000^{th}$ of an inch from a remainder of said side wall.

5. A fuel tank according to claim 1 wherein said raised region is adapted to retain a tip of a fuel nozzle thereon during fueling of said tank with fuel from said fuel nozzle.

6. A fuel tank according to claim 1 wherein said raised region extends radially inwardly into said interior of said tube a distance sufficient to retain a fuel nozzle in position within said interior during fueling of fuel into said fuel tank from said fuel nozzle when an operator releases a hold on said fuel nozzle.

7. A fuel tank according to claim 1 wherein said raised region extends radially inwardly into said interior of said tube a distance that is insufficient to block passage of a fuel nozzle inserted into said interior.

8. A fuel inlet, comprising:
   a fuel tank that defines a tank interior;
   a tube formed of a single, elongate unitary cylindrical body including a continuous side wall having a continuous interior surface that defines an interior adapted for receiving a fuel nozzle therein and that defines a tank receiving fuel flow path, wherein a majority of said tube is positioned within said fuel tank interior;
   said continuous side wall including a flared opening adapted for receiving a fuel nozzle there through;
   said continuous side wall including a rigid raised region that extends circumferentially around said interior surface of said side wall and inwardly into said interior, wherein said interior surface defines a smooth, continuous surface with an absence of discontinuities between said flared opening and said raised region, and wherein said raised region is positioned downstream in said fuel flow path from said flared opening; and
   an anti-siphon device positioned completely within said interior of said tube and secured to said interior surface of said tube downstream from said raised region.

9. A fuel inlet according to claim 8 wherein said raised region on said interior surface of said side wall defines a recessed region on an exterior surface of said side wall.

10. A fuel inlet according to claim 8 wherein a region of said interior surface excluding said raised region defines a first inner diameter, and wherein said raised region defines a second inner diameter smaller than said first inner diameter.

11. A fuel inlet according to claim 8 wherein said raised region is manufactured by the process of impacting an exterior of said tube.

12. A method of manufacturing a fuel inlet, comprising:
    providing a fuel tank that defines a tank interior;
    providing a single, unitary elongate tube adapted for securement to a fuel tank, said tube having a side wall that defines an exterior surface and an interior surface adapted to guide fuel there through from a fuel nozzle;
    placing an anti-siphon structure completely within an interior of said tube;
    impacting said exterior surface of said elongate tube so as to define a fixed raised structure on said interior surface, said fixed raised structure extending completely around a circumference of said interior surface and adapted to retain a fuel nozzle in place thereon;
    impacting said exterior surface of said elongate tube so as to define a second raised structure on said interior surface, said second raised structure securing said anti-siphon structure within said tube such that said anti-siphon structure is positioned downstream from said fixed raised structure; and
    securing said tube to said fuel tank such that a majority of said tube is positioned within said tank interior.

13. A method according to claim 12 wherein said impacting comprises stamping.

14. A method according to claim 12 wherein said fixed raised structure defines a rib that extends radially inwardly of a remainder of said interior surface at least $20/1,000^{th}$ of an inch.

15. A method according to claim 13 wherein said step of stamping comprises stamping said exterior surface at least four times around a circumference of said elongate tube.

16. A method according to claim 12 wherein said impacting defines a circumferentially extending recess on said exterior surface of said tube.

17. A method according to claim 13 wherein a stamping tool utilized for said stamping extends at least fifty degrees around said circumference of said tube.

18. A method of retaining a fuel nozzle in a fuel inlet, comprising:
    providing a fuel tank that defines a tank interior;
    providing a single, unitary, elongate fuel inlet having a majority thereof positioned within said tank interior, said fuel inlet defining a cylindrical cavity through which fuel enters said fuel tank and which is adapted to receive a fuel nozzle therein, said fuel inlet including a fixed raised rib on said fuel inlet that extends inwardly into said cylindrical cavity and an anti-siphon device secured completely within said cylindrical cavity of said fuel inlet and downstream of said fixed raised rib; and
    positioning a fuel nozzle in said cylindrical cavity of said fuel inlet such that said fuel nozzle contacts an opening of said fuel inlet at only a single tangential point on an underside of said fuel nozzle and contacts said raised rib of said fuel inlet at only a single tangential point on an upper side of said fuel nozzle, wherein said raised rib retains said fuel nozzle in position in said fuel inlet when said fuel nozzle is released by an operator.

19. A method according to claim 18 wherein said raised rib defines a recessed region on an exterior surface of said fuel inlet.

20. A method according to claim 19 wherein said raised rib extends completely around a circumference of said cylindrical cavity of said fuel inlet.

21. A method according to claim 18 wherein said fuel inlet is secured to said fuel tank such that said fuel inlet transports fuel from a fuel nozzle positioned within said fuel inlet into said fuel tank through said anti-siphon device positioned completely within said interior of said fuel inlet.

\* \* \* \* \*